(12) United States Patent
Ozeki et al.

(10) Patent No.: US 6,609,389 B2
(45) Date of Patent: Aug. 26, 2003

(54) AUTOMOTIVE AIR CONDITIONER

(75) Inventors: Yukio Ozeki; Masaharu Onda; Hidenobu Arakawa, all of Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/028,977

(22) Filed: Dec. 28, 2001

(65) Prior Publication Data

US 2002/0084058 A1 Jul. 4, 2002

(30) Foreign Application Priority Data

Dec. 28, 2000 (JP) ........................................ 2000-402747

(51) Int. Cl.[7] ................................................. B60H 1/32
(52) U.S. Cl. ......................................... 62/244; 454/121
(58) Field of Search ............................ 62/244; 454/121, 454/156

(56) References Cited

U.S. PATENT DOCUMENTS

| 5,062,473 A | | 11/1991 | Ostrand et al. | |
|---|---|---|---|---|
| 5,080,140 A | | 1/1992 | Ostrand et al. | 137/875 |
| 5,263,893 A | * | 11/1993 | Hoffman et al. | 454/69 |
| 5,391,112 A | * | 2/1995 | Wardlaw | 454/139 |
| 5,564,979 A | * | 10/1996 | Sumiya et al. | 454/121 |
| 5,643,079 A | * | 7/1997 | Miyata et al. | 454/134 |
| 6,048,263 A | * | 4/2000 | Uchida et al. | 454/121 |
| 6,224,480 B1 | * | 5/2001 | Le et al. | 454/156 |
| 6,270,400 B1 | * | 8/2001 | Tsurushima et al. | 454/121 |
| 6,351,961 B1 | * | 3/2002 | Kurokawa e tal. | 454/121 |
| 6,352,102 B1 | * | 3/2002 | Takechi et al. | 165/203 |

FOREIGN PATENT DOCUMENTS

| EP | 0 911 196 | 4/1999 |
|---|---|---|
| JP | 10-71824 | 3/1998 |
| JP | 11-139140 | 5/1999 |

* cited by examiner

*Primary Examiner*—William E. Tapolcai
*Assistant Examiner*—Mohammad M Ali
(74) *Attorney, Agent, or Firm*—Foley & Lardner

(57) ABSTRACT

A casing defines therein an air intake opening, an evaporator chamber, a full-passage, a bypass-passage and an air-mix chamber. A housing having a downwardly curved upper wall is incorporated with the casing to cover the air-mix chamber. An air blow is provided which forces air to enter the evaporator chamber from the air intake opening. An air-mix door is movably installed in the casing to selectively open and close the full-passage and the bypass-passage. An evaporator is installed in the evaporator chamber, and a heater core is installed in the full-passage. The downwardly curved upper wall is formed with first, second and third openings which are communicated with given portions of a passenger room of the vehicle respectively. A slide door assembly is mounted below the downwardly curved upper wall. The slide door assembly includes two slide doors which are arranged to vary the open area of the first, second and third openings in cooperation with each other.

21 Claims, 6 Drawing Sheets

AUTOMOTIVE AIR CONDITIONER

BACKGROUND OF THE INVENTION

1. Field of the Invention

The present invention relates in general to automotive air conditioners, and more particular to the automotive air conditioners of a type that is compact in size and provides various air blow modes with the aid of slide doors.

2. Description of the Related Art

Hitherto, various automotive air conditioners have been proposed and put into practical use. Some of them are of a type that can provide various air-blow modes, such as Ventilation-mode, Defrost-mode, Foot-mode and the like. For establishing such modes, the air conditioner is provided, at a position downstream of an air-mix chamber, with a plurality of air outlet openings which lead through respective ducts to defrosting air-blow openings, ventilation air-blow openings and foot warming air-blow openings which are exposed to given portions of a passenger room of an associated motor vehicle. The air outlet openings at the air-mix chamber are controlled by control doors for selectively establishing the air-blow modes.

Some of the automotive air conditioners of such type are shown in Japanese Laid-open Patent Applications (Tokkai-hei) 11-139140 and 10-71824. In the air conditioners of these publications, slide doors and/or rotary doors are used as the control doors for the purpose of reducing the size of the air conditioner as well as smoothing the air flow through given passages defined in a case of the air conditioner.

However, even the measures disclosed by such publications have failed to provide an automotive air conditioner which is satisfactorily compact in size. If other measure is applied to the air conditioner for much more reducing the size, the performance regarding smoothed air flow for the air-blow modes is sacrificed.

SUMMARY OF THE INVENTION

It is therefor an object of the present invention to provide an automotive air conditioner which is compact in size and can exhibit a satisfied performance in providing smoothed air flow for the air-blow modes irrespective of the compact construction.

According to the present invention, there is provided an air conditioner of an a motor vehicle, which comprises a casing including an air intake opening, an evaporator chamber, a full-passage, a bypass-passage and an air-mix chamber, each of the full-passage and said bypass-passage extending from the evaporator chamber to the air-mix chamber independently; a housing having a downwardly curved upper wall which is incorporated with the casing to cover the air-mix chamber; an air flow producing device which forces air to enter the evaporator chamber of the casing from the air intake opening of the same; an air-mix door movably installed in the casing to selectively open and close the full-passage and the bypass-passage; an evaporator installed in the evaporator chamber; a heater core installed in the full-passage; first, second and third openings formed in the downwardly curved upper wall of the housing, the first, second and third openings being communicated with given portions of a passenger room of the vehicle respectively; and a slide door assembly mounted below the downwardly curved upper wall of the housing, the slide door assembly including first and second slide doors which are arranged to vary the open area of the first, second and third openings in cooperation with each other.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, the present invention will be described in detail with reference to the accompanying drawings.

For ease of understanding, various directional terms, such as, left, right, upper, lower, leftward, etc., are used in the description. However, such directional terms are to be understood with respect to only a drawing or drawings on which the corresponding part or portion is illustrated.

Figure 1:
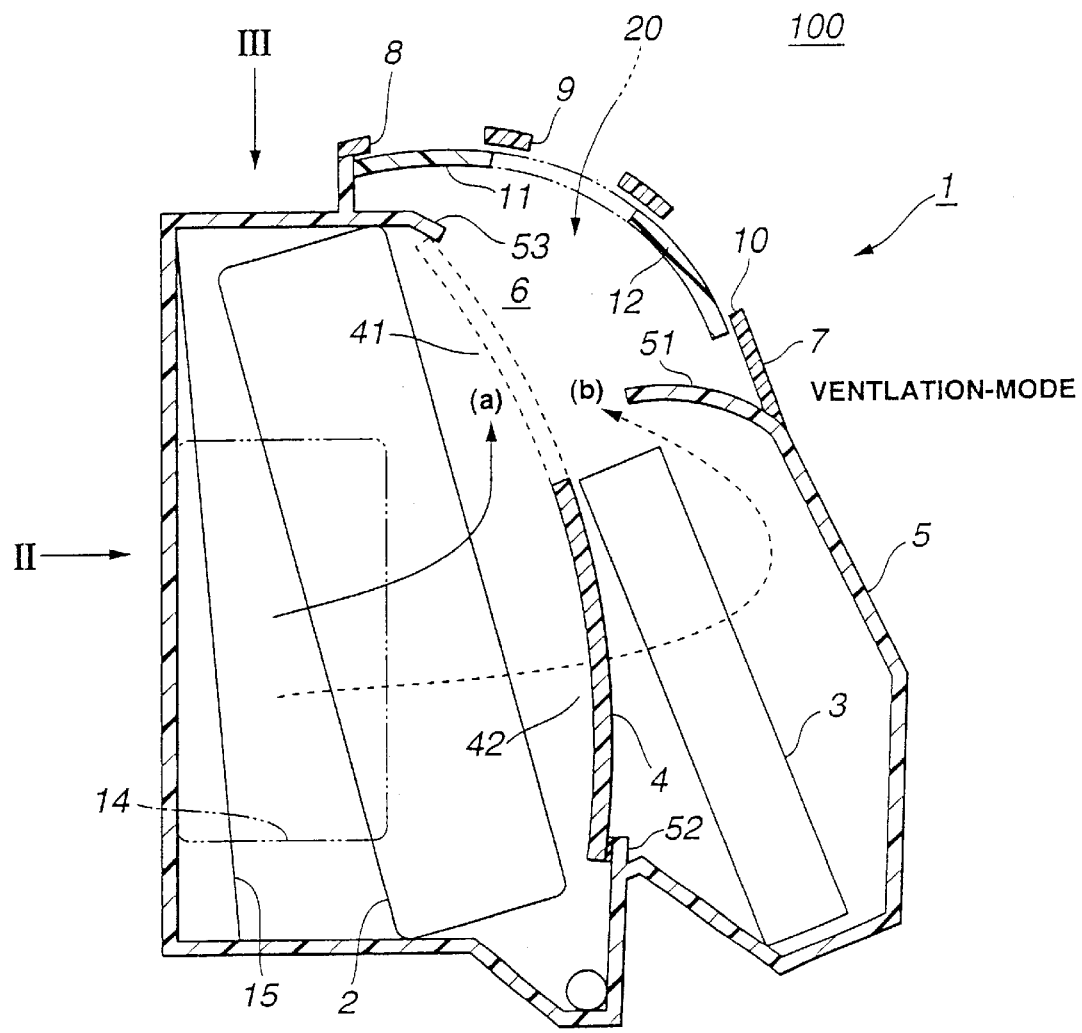
FIG. 1 is a sectional view of an automotive air conditioner of the present invention, showing Ventilation-mode.
Figure 2:
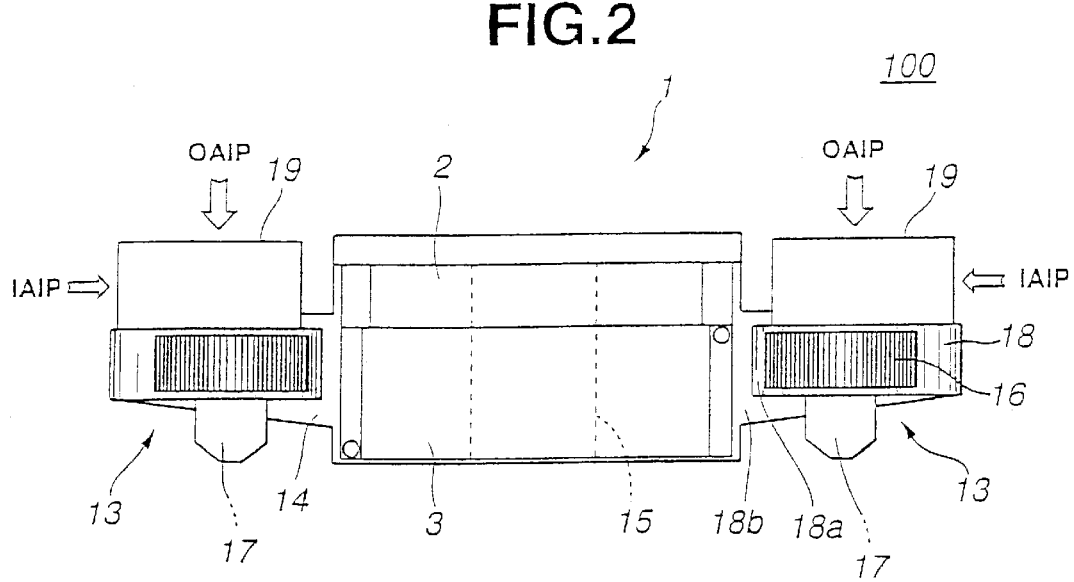
FIG. 2 is a sectional view taken from the direction of the arrow "II" of FIG. 1.
Figure 3:
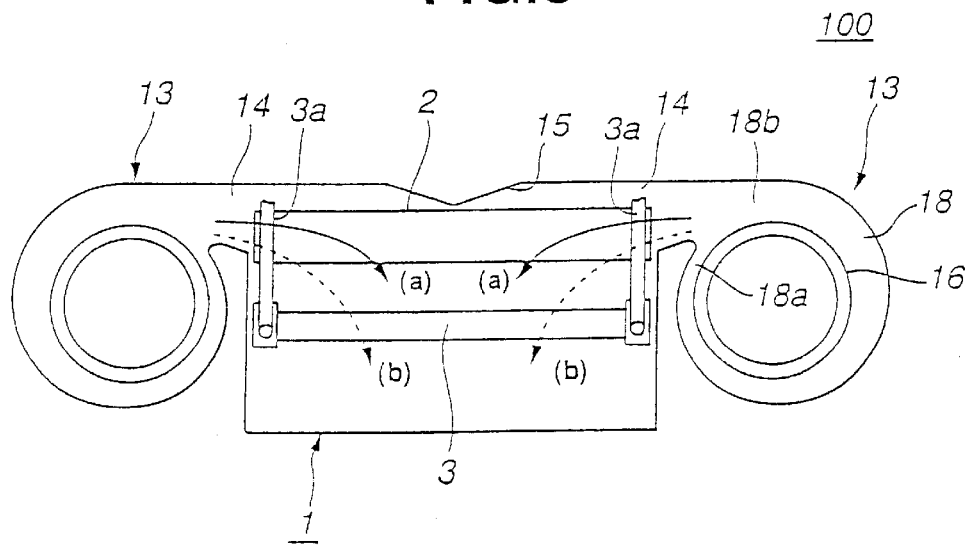
FIG. 3 is a sectional view taken from the direction of the arrow "III" of FIG. 1.

Referring to FIGS. 1 to 8 of the drawings, particularly FIGS. 1 to 3, there is shown an automotive air conditioner of a first embodiment of the present invention, which is generally denoted by numeral 100.

As is understood from FIG. 1, the air conditioner 100 comprises a unit case 1 which generally consists of a casing 5 and a housing 7 which are coupled. Within the casing 5, there are arranged an evaporator 2, a heater core 3 and an air-mix door 4. More specifically, the evaporator 2 is installed in an evaporator chamber provided at an upstream part in the casing 5. The evaporator 2 is larger than the heater core 3 in size. The housing 7 is mounted on an upper part of the casing 5 in a manner to define therebetween an air-mix chamber 6.

More specifically, the evaporator 2 and the heater core 3 are respectively installed in upstream and downstream portions of the casing 5, and the air-mix chamber 6 is positioned downstream the heater unit 3. The air-mix door 4 is of a slide type which is slidably installed between the evaporator 2 and the heater core 3 to provide a full-passage 42 which extends from the evaporator 2 to the air-mix chamber 6 through the heater core 3 as well as a bypass-passage 41 which extends from the evaporator 2 to the air-mix chamber 6 bypassing the heater core 3.

The full-passage 42 is equipped at a downstream end with an air flow guide 51 for smoothly guiding air toward an upstream part of the air-mix chamber 6. By sliding the air-mix door 4 to a desired position, the rate between air flow amount in the full-passage 42 and that in the bypass-passage 41 is varied or controlled, which provides the air-mix chamber 6 with an air flow amount having a desired temperature. That is, under operation of the air conditioner 100, air running through the full-passage 42 and air running through the bypass-passage 41 are mixed in the air-mix chamber 6 which is positioned above the heater core 3.

As is seen from the drawing, the evaporator 2 and the heater core 3 are arranged to face the air flow at substantially right angles, and these two devices 2 and 3 stand in the casing 5 in generally parallel with each other.

The housing 7 is formed at its downwardly curved upper wall with first, second and third outlet openings 8, 9 and 10. As will be described in detail hereinafter, these outlet openings 8, 9 and 10 are connected through respective ducts to defrosting air-blow openings, ventilation air-blow openings and foot warming air-blow openings which are exposed to given portions of a passenger room.

Mounted below the downwardly curved upper wall of the housing 7 is a slide door assembly 20. The slide door assembly 20 comprises first and second curved slide doors 11 and 12 which are slid beneath a concavelly curved inner surface of the downwardly curved upper wall of the housing 7 in a manner to vary the open area of the first, second and third openings 8, 9 and 10. Each of the first and second slide doors 11 and 12 has a convex outer surface. The detailed structure of the slide door assembly 20 will be described hereinafter.

Although not shown in the drawing, the evaporator 2 is connected through pipes to a compressor, a condenser, an expansion valve and other known parts to constitute a refrigeration system. As will become apparent as the description proceeds, upon operation of the air conditioner 100, air blowers 13 (see FIGS. 2 and 3) are energized to lead air into the upstream part of the unit case 1 from respective side openings 14 formed in side walls of the casing 5, and the air is cooled by the evaporator 2 when passing through the same.

The heater core 3 is connected through pipes 3a (see FIG. 3) to a water jacket of an associated automotive engine and supplied with an engine cooling water which is warmed by the engine. Thus, upon operation of the air conditioner 100, the cooled air from the evaporator 2 is warmed by the heater core 3 when passing through the same.

When, as shown in FIG. 1, the air-mix door 4 takes a lowermost position to close the full-passage 42, all of the cooled air from the evaporator 2 is led into the air-mix chamber 6 as is indicated by the arrow "a", and when the air-mix door 4 takes an uppermost position to close the bypass-passage 41, all of the cooled air from the evaporator 2 is led to the heater core 3 to be warmed before reaching the air-mix chamber 6. While, when the air-mix door 4 takes a middle position between the above-mentioned lowermost and uppermost positions to partially open (or close) both the full-passage 42 and bypass passage 41, the cooled air from the evaporator 2 is led to the air mix chamber 6 through the two passages 42 and 41 separately. As is mentioned hereinabove, by placing the air-mix door 4 at a desired position, the rate between the air flow amount in the full-passage 42 and that in the bypass-passage 41 is adjusted and thus the air led to the air-mix chamber 6 can have a desired temperature.

Denoted by numeral 52 is a lower edge of the casing 5 to which a lower end of the air-mix door 4 contacts when the door 4 fully closes the full-passage 42, and denoted by numeral 53 is an upper edge of the casing 5 to which an upper end of the door 4 contacts when the door 4 fully closes the bypass-passage 41. These lower and upper edges 52 and 53 are equipped with sealing members (not shown) for achieving a sealing against the door 4.

As is seen from FIGS. 2 and 3, the two air blowers 13 are of a centrifugal type, which are mounted on the side walls of the unit case 1 to feed air into the case through the side openings 14 respectively. Each air blower 13 comprises a multiblade fan 16 for producing air flow and an electric motor 17 for driving the fan 16. The fan 16 is installed in a scroll chamber 18 defined in an air intake unit which comprises an outlet air intake port "OAIP" into which an outside air is led, an inner air intake port "IAIP" into which air in the passenger room is led and a port switching mechanism 19. The port switching mechanism 19 varies a rate of open area between the outlet air intake port "OAIP" and the intake air intake port "IAIP". The scroll chamber 18 is helically-shaped with a narrower inlet part 18a which is connected to the outlet and inlet air intake ports "OAIP" and "IAIP" and a larger outlet part 18b which is exposed to the side opening 14 of the unit case 1.

Denoted by numeral 15 is an air guide formed on an inner surface of a front wall of the case unit 1 at a middle position between the two side openings 14. The air guide 15 comprises two flat surfaces which are inclined to smoothly guide air flows from the side openings 14 toward desired directions as shown in FIG. 3.

Figure 8:
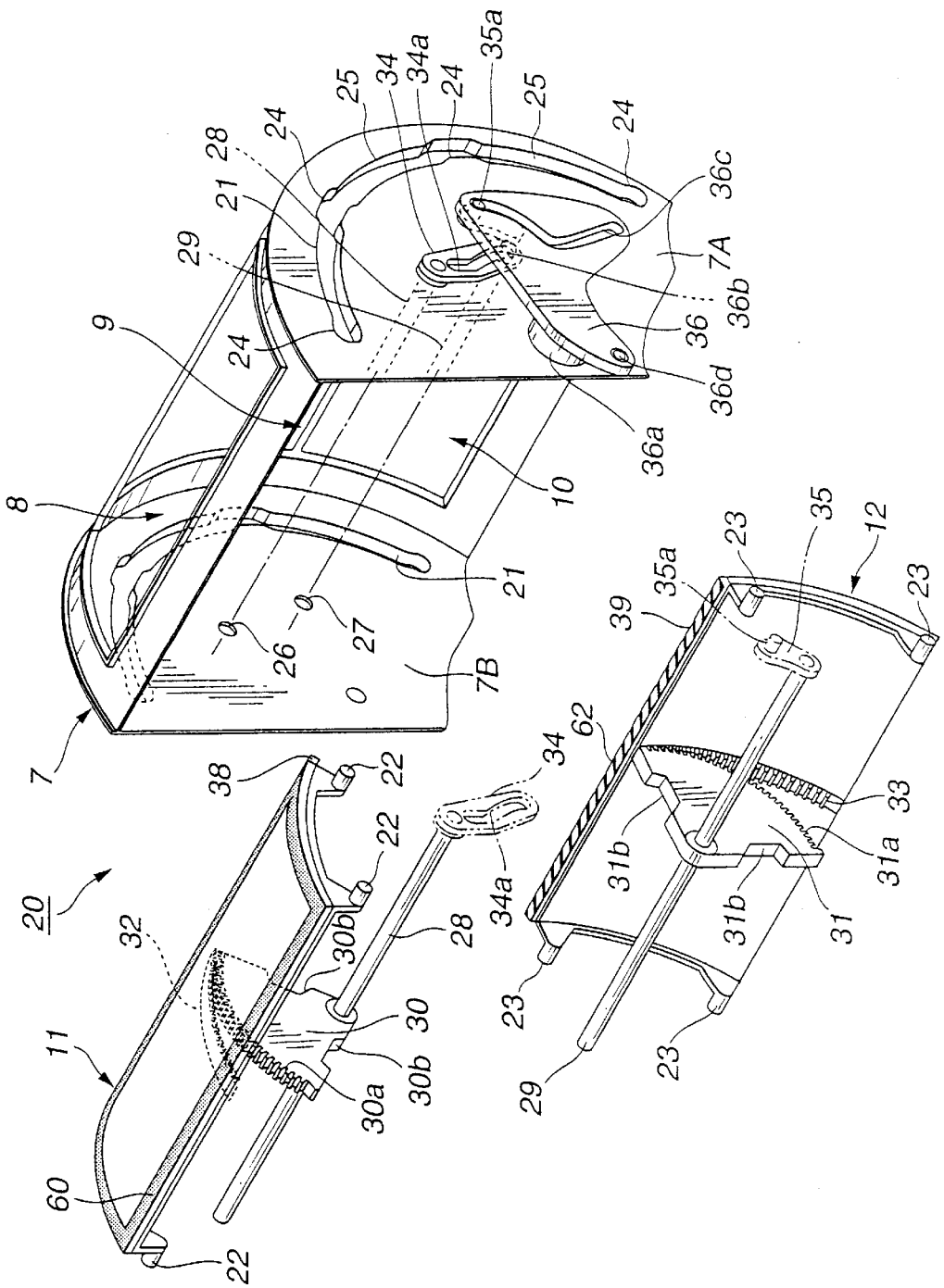
FIG. 8 is an exploded view of a slide door assembly installed in the automotive air condition of the invention.

Referring to FIG. 8, there is shown the detail of the slide door assembly 20 in an exploded manner.

As shown, the first, second and third outlet openings 8, 9 and 10 of the housing 7 are rectangular in shape and arranged in order. Although not shown in the drawing, the first outlet opening 8 is led through ducts to defrosting air-blow openings which face to a windshield and side window panes, the second outlet opening 9 is led through ducts to ventilation air-blow openings which are exposed to middle-high positions of a passenger room and the third outlet opening 10 is led through ducts to foot warming air blow openings which are exposed to lower portions of the passenger room. Side walls 7A and 7B of the housing 7 are respectively formed with curved guide slots 21, each extending along the downwardly curved upper wall of the housing 7 between a lower end near the lower edge of the third outlet opening 10 and an upper end near the upper edge of the first outlet opening 8, as shown. Slidably guided by the curved guide slots 21 are the first and second curved slide doors 11 and 12. That is, the whether the three openings, viz., first, second and third outlet openings 8, 9 and 10, are opened is controlled by the two doors, viz., the first and second slide doors 11 and 12.

The first slide door 11 is provided at both sides with paired guide pins 22 which are slidably engaged with upper portions of the respective guide slots 21, and similar to this, the second slide door 12 is provided at both sides with paired guide pins 23 which are slidably engaged with lower portions the respective guide slots 21. The first slide door 11 slides within an area to control the first and second outlet openings 8 and 9, while the second slide door 12 slides within an area to control the second and third outlet openings 9 and 10. More specifically, the first slide door 11 slides between an uppermost position where it closes only the first outlet opening 8 (see FIG. 1) and a lowermost position where it closes only the second outlet opening 9 (see FIG. 7), and the second slide door 12 slides between an uppermost position where it closes only the second outlet opening 9 (see FIG. 5) and a lowermost position where it closes only the third outlet opening 10 (see FIG. 1).

Figure 6:
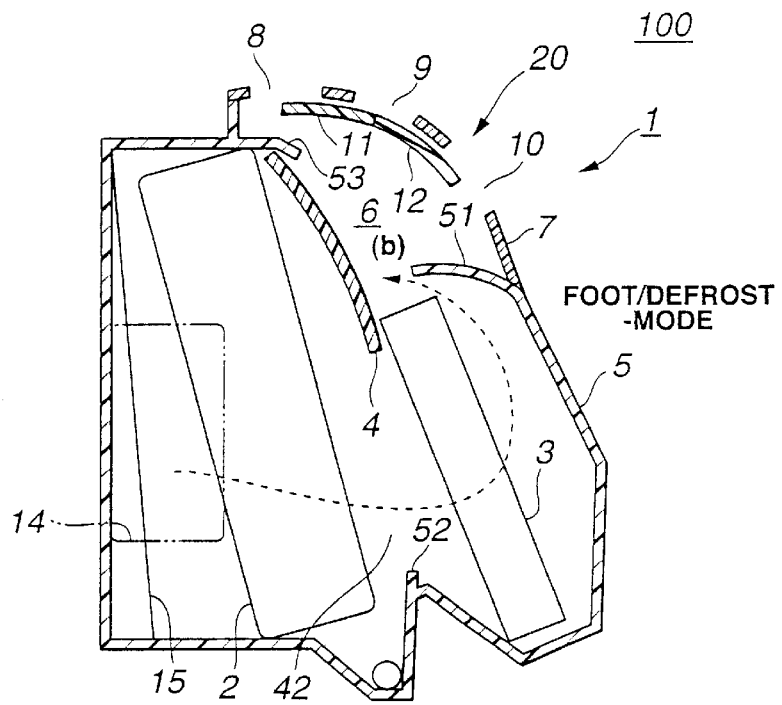
FIG. 6 is a view also similar to FIG. 1, but showing Foot/Defrost-mode.

Each slide door 11 or 12 is equipped on a convex outer surface thereof with a sealing member 60 which contacts the concave inner surface of the downwardly curved upper wall of the housing 7 to achieve sealing between the door 11 or 12 and the downwardly curved upper wall. Furthermore, one of mutually facing edges 38 and 39 of the first and second slide doors 11 and 12 is equipped with a sealing member 62, so that when the two doors 11 and 12 take such a position as shown in FIG. 6 where the facing edges contact, a seal is achieved therebetween.

The curved guide slots 21 are each formed at a lower or inside wall thereof with projected portions 24 which are spaced from one another by a given distance. That is, when each slide door 11 or 12 is slid to the close positions, the guide pins 22 or 23 are brought onto the projected portions 24, so that the door 11 or 12 is pressed against the inner surface of the downwardly curved upper wall of the housing 7. Thus, upon assuming such close positions, the door 11 or 12 is immovably and hermetically kept in the positions. Of course, when the guide pins 22 or 23 are positioned on lower portions 25 other than the projection portions 24, the door 11 or 12 is permitted to make a smoothed sliding movement.

In order to drive or move the slide doors 11 and 12 in the above-mentioned manner, a door drive mechanism is further employed which is shown in FIG. 8.

As shown in the drawing, the door drive mechanism comprises two drive shafts 28 and 29 which are rotatably held by the side walls 7A and 7B of the housing 7. For this holding, the side walls 7A and 7B are formed with two openings 26 and 27 respectively. That is, the drive shaft 28 is held by the openings 26 and the other drive shaft 29 is held by the other openings 27. Each drive shaft 28 or 29 is provided with a sector gear 30 or 31 which is engaged with a concave rack 32 or 33 provided on the concave inner surface of the slide door 11 or 12. As shown, the concave rack 32 or 33 is provided at a laterally middle portion of the slide door 11 or 12, so that a drive force from the sector gear 30 or 31 is steadily applied to the entire construction of the slide door 11 or 12.

Members of the teeth 30a or 31a of the sector gear 30 or 31 provided at opposed end portions have a height which gradually increases as the members near the ends, so that even when the sector gear 30 or 31 swings largely, the meshed engagement between the sector gear 30 or 31 and the concave rack 32 or 33 is kept. Each sector gear 30 or 31 is provided at opposed edges with recesses 30b or 31b, so that interference between the two sector gears 30 and 31 is suppressed.

As is understood from the drawing (FIG. 8), right ends of the drive shafts 28 and 29 are projected outward from the right side wall 7A. To the projected right ends of the drive shafts 28 and 29, there are fixed respective links 34 and 35. The link 34 is formed with a slot 34a and the other link 35 is provided at a leading end thereof with a projection 35a. As is seen from the drawing, a drive lever 36 is mounted on the right side wall 7A in a manner to pivot about an axis of a pivot stud 36a. The drive lever 36 has both a projection 36b which is slidably engaged with the slot 34a of the link 34 and a bent slot 36c which slidably receives the projection 35a of the link 35. The drive lever 36 has an opening 36d to which a drive rod (not shown) is pivotally connected. Thus, when, due to actuation of the drive rod, the drive lever 36 is pivoted about the axis of the pivot stud 36a in a clockwise or counterclockwise direction, the two drive shafts 28 and 29 are turned about respective axes thereby to slide the first and second curved slide doors 11 and 12 along the guide slots 21 in such a manner as will be described hereinafter.

In the following, operation of the air conditioner 100 will be described with reference to the drawings, particularly FIGS. 1 and 4 to 7. In fact, FIGS. 1 and 4 to 7 show Ventilation-mode, Ventilation/Foot-mode, Foot-mode, Foot/Defrost-mode and Defrost-mode, respectively.

Usually, Ventilation-mode is a mode wherein conditioned cooler air can be blown toward heads of passengers, Foot-mode is a mode wherein conditioned warmer air can be blown toward feet of the passengers and Defrost-mode is a mode wherein conditioned air can be blown toward a windshield and front side window panes. Furthermore, Ventilation/Foot-mode is a mode wherein conditioned cooler air can be blown toward the heads of the passengers and at the same time conditioned warmer air is blown the feet of the passengers. Foot/Defrost-mode is a mode wherein conditioned warmer air can be blown to the feet of the passengers and at the same time conditioned air can be blown to the windshield and the front side windows.

For ease of understanding, description of operation will be commenced with respect to Ventilation-mode shown in FIG. 1.

Under this mode, the air-mix door 4 takes a lower position and the first and second slide doors 11 and 12 close the first and third outlet openings 8 and 10 respectively. That is, only the second outlet opening 9 is opened.

Thus, under this mode, air from the air blowers 13 is forced to flow in the direction as indicated by the arrow "a". That is, the air is cooled by the evaporator 2 and led into the air-mix chamber 6 through the bypass-passage 41. Thus, cooled air is fed to the passenger room from the second outlet opening 9. Of course, if the air-mix door 4 is in a lower position to partially open the full-passage 42, warmed air is added to the air in the air-mix chamber 6 and thus the cooled air fed to the passenger room from the ventilation air blow openings is somewhat warmed. As has been mentioned hereinabove, by controlling the position of the air-mix door 4, the temperature of the conditioned air fed to the passenger room can be controlled.

Figure 4:
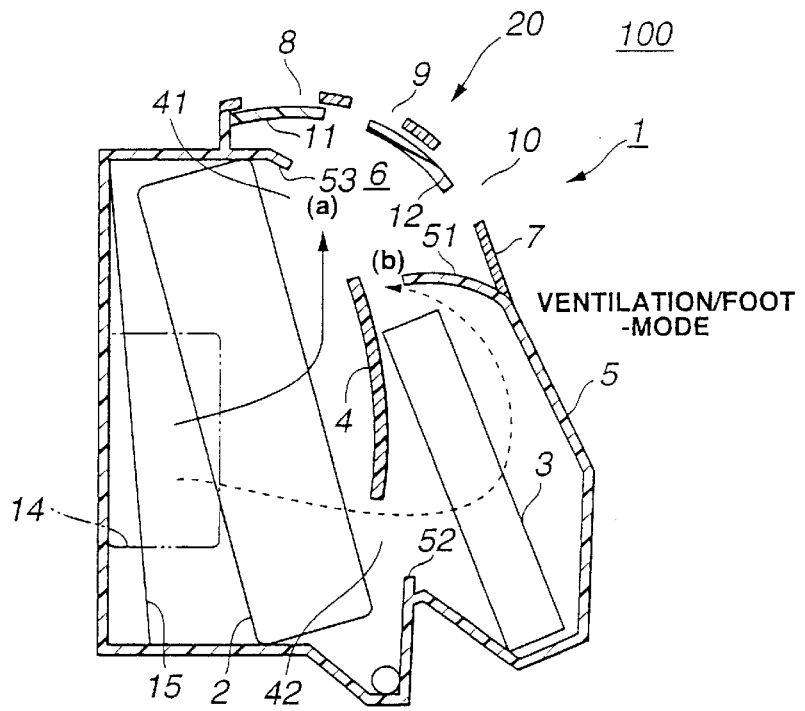
FIG. 4 is a view similar to FIG. 1, but showing Ventilation/Foot-mode.

When then, due to manipulation of the drive lever 36 (see FIG. 8) of the door drive mechanism, the second slide door 12 is slid up to a position to partially open the second and third outlet openings 9 and 10 and at the same time the air-mix door 4 is moved up to an intermediate position to partially open (or close) both the bypass-passage 41 and the full-passage 42, Ventilation/Foot-mode is established as shown in FIG. 4. Under this mode, a part of cooled air from the evaporator 2 is directly led to the air-mix chamber 6 through the bypass-passage 41 and the other part of cooled air from the evaporator 2 is forced to pass through the full-passage 42 and thus the heater core 3 before reaching the air-mix chamber 6, and the mixed air in the air-mix chamber 6 is fed to the passenger room from the second and third outlet openings 9 and 10. As is shown by the dotted line "b" of the drawing, during this operation, the warmed air from the heater core 3 is smoothly guided toward an upstream part of the air-mix chamber 6. Actually, due to an unique arrangement of the air-mix chamber 6 and its associated parts, relatively cooler air is led to the second outlet opening 9 and relatively warmer air is led to the third opening.

Figure 5:
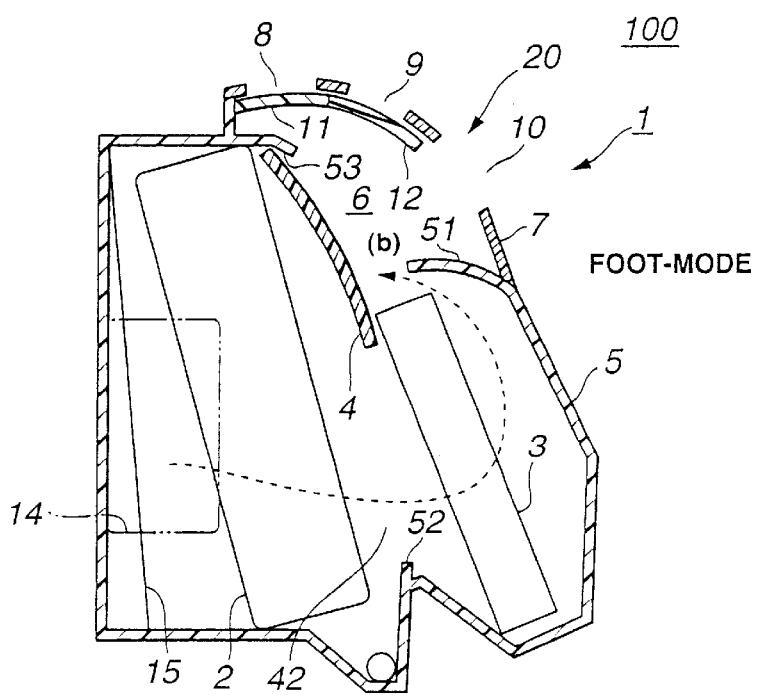
FIG. 5 is a view also similar to FIG. 1, but showing Foot-mode.

When then, due to further manipulation of the drive lever 36 of the door drive mechanism (see FIG. 8), the second slide door 12 is further slid up to a position to fully close the second outlet opening 9 and fully open the third outlet opening 10 and at the same time the air-mix door 4 is moved up to an upper position, Foot-mode is established as shown in FIG. 5. Under this mode, only the full-passage 42 is opened. Thus, air from the evaporator 2 is forced to flow through the heater core 3 and thus warmed air is led to the third outlet opening 10 through the airmix chamber 6. Of course, if the air-mix door 4 is in an upper position to partially open the bypass-passage 41, cooled air from the evaporator 2 is added to the air in the air-mix chamber 6 and thus the warmed air fed to the foot space of the passenger room is somewhat cooled.

When, then, due to further manipulation of the drive lever 36 of the door drive mechanism, the first slide door 11 is slid down to a position to partially open (or close) both the first and second outlet openings 8 and 9 and the second slide door 12 is slid down to a position to partially open (or close) both the second and third outlet openings 9 and 10, Foot/Defrost-mode is established as shown in FIG. 6. Under this mode, warmed air from the heater core 3 is led to the air-mix chamber 6 and then led to both the first and third outlet openings 8 and 10. That is, warmed air is blown to the windshield to defrost the same and the foot space of the passenger room to warm feet of the passengers.

Figure 7:
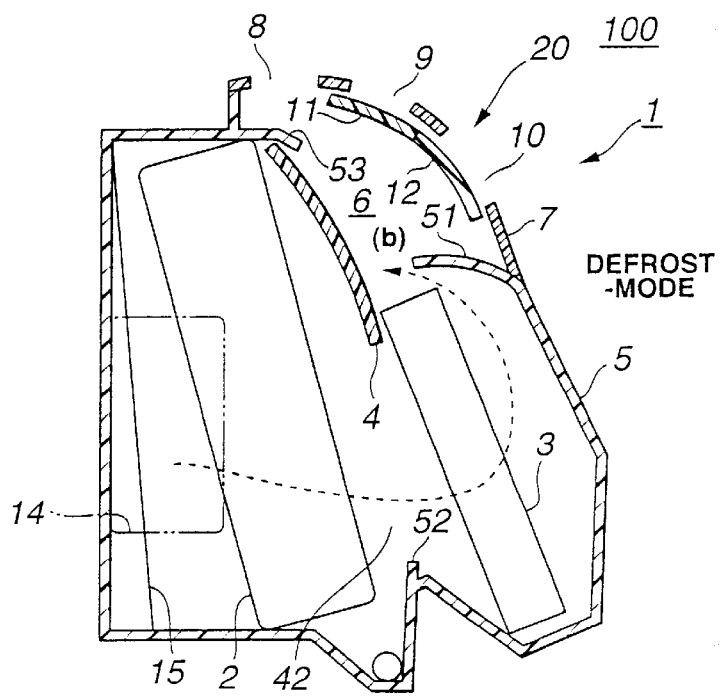
FIG. 7 is a view also similar to FIG. 1, but showing Defrost-mode.

When then, due to further manipulation of the drive lever 36 of the door drive mechanism, the first slide door 11 is slid down to a position to fully close the second outlet opening 9 and the second slide door 12 is slid down to a position to fully close the third opening 10, Defrost-mode is established as shown in FIG. 7. Under this mode, only the first outlet opening 8 is opened, and thus larger amount of warmed air is blown to the windshield to speed up the defrosting effect.

In the above-mentioned air conditioner 100, the larger evaporator 2 and the smaller heater core 3 stand generally parallel to each other, (i.e., they are positioned in a generally parallel arrangement), and the air-mix chamber 6 is located in a space defined above the heater core 3, and the slide door assembly 20 is installed under the housing 7 in the above-mentioned manner. The slide door assembly 20 has the first and second slide doors 11 and 12 which are incorporated to control the open area of the three openings, viz., first, second and third outlet openings 8, 9 and 10. Accordingly, the air conditioner 100 can be constructed sufficiently compact in size.

The first, second and third outlet openings 8, 9 and 10 have each a full-open condition, so that Defrost-mode, Ventilation-mode and Foot-mode are assuredly provided.

Due to provision of the two air blowers 13, a sufficient amount of air can be led into the case unit 1 through the side openings 14 with ease. That is, smaller air blowers 13 can be used, which reduces noises produced therefrom.

Because the air conditioner 100 has a symmetric construction as is understood from FIGS. 2 and 3, the air conditioner 100 can be evenly applied to both a motor vehicle with a steering wheel at right side and a motor vehicle with the steering wheel at left side.

Due to provision of the air guide 15 formed on the inner surface of the front wall of the case unit 1 at the middle position between the two side openings 14, air flows from the two air flowers 13 through the side openings 14 are smoothly guided toward the desired positions of the evaporator 2, which induces an improved performance of the evaporator 2.

Due to usage of the scroll chambers 18 for the two air blowers 13, a compact air feeding mechanism is provided, which promotes the compact construction of the air conditioner 100.

Figure 9:
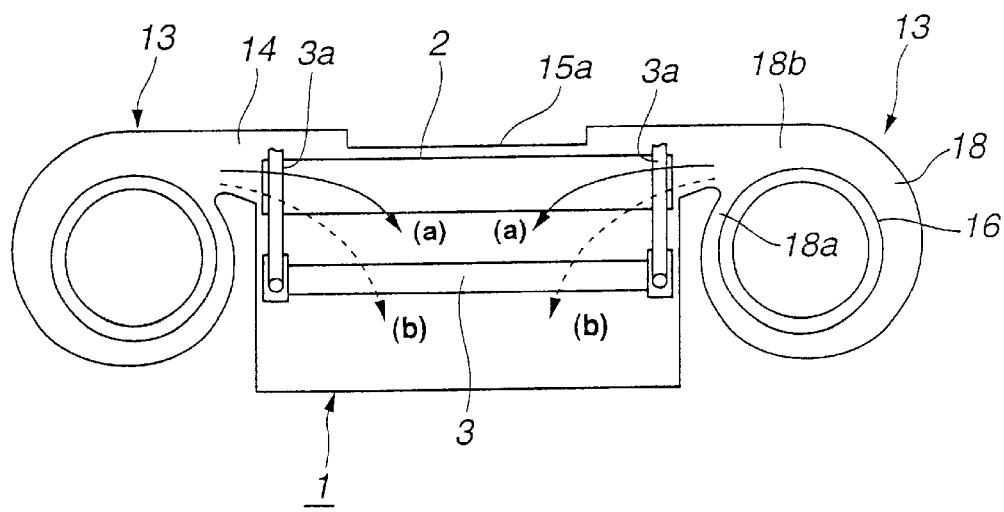
FIG. 9 is a view similar to FIG. 3, but showing an automotive air conditioner of a second embodiment of the present invention.
Figure 10:
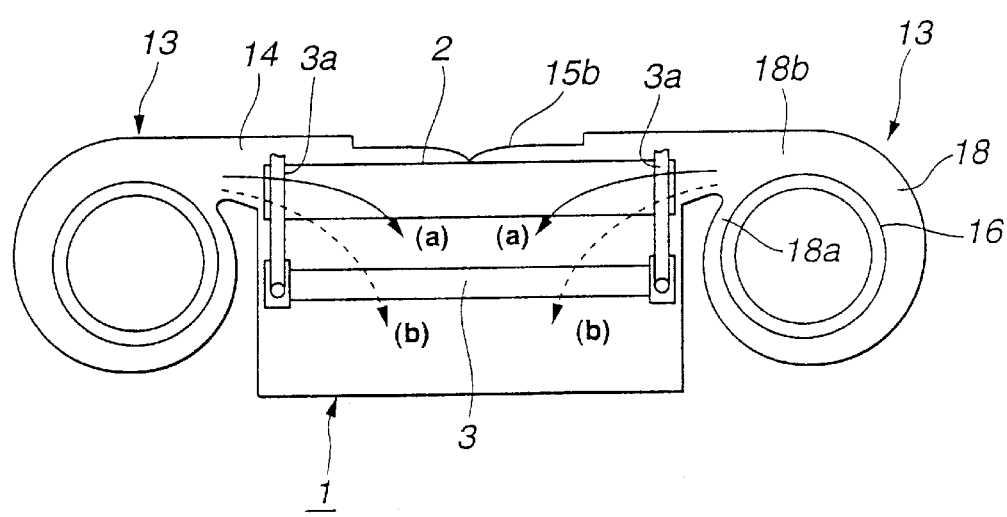
FIG. 10 is a view also similar to FIG. 3, but showing an automotive air conditioner of a third embodiment of the present invention.

Referring to FIG. 9, there is shown an automotive air conditioner 200 which is a second embodiment of the present invention.

In this embodiment 200, in place of the above-mentioned air guide 15 in the first embodiment 100, a larger projection 15a is formed on the inner surface of the front wall of the case unit 1. Due to the provision of such projection 15a, the air flow passage defined upstream of the evaporator 2 is narrowed. With this, the flow rectifying effect is improved.

Referring to FIG. 9, there is shown an automotive air conditioner 300 which is a third embodiment of the present invention.

In this embodiment 300, an air guide 15b of a combination type including the above-mentioned air guide 15 and air guide 15a is employed.

The entire contents of Japanese Patent Application 2000-402747 (filed Dec. 28, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An air conditioner of a motor vehicle, comprising:
   a casing including an air intake opening, an evaporator chamber, a full-passage, a bypass-passage and an air-mix chamber, each of said full-passage and said bypass-passage extending from said evaporator chamber to said air-mix chamber independently;
   a housing having a downwardly curved upper wall which is incorporated with said casing to cover said air-mix chamber, said downwardly curved upper wall having first, second and third outlet openings which are adapted to communicate with given portions of a passenger room of the vehicle respectively;
   an air flow producing device which forces air into said evaporator chamber from said air intake opening;
   an air-mix door movably installed in said casing to selectively open and close said full-passage and said bypass-passage;
   an evaporator installed in said evaporator chamber;
   a heater core installed in said full-passage; and
   a slide door assembly mounted below said downwardly curved upper wall of said housing, said slide door assembly including first and second slide doors which are arranged to vary the open area of the first, second and third outlet openings in cooperation with each other,
   wherein said evaporator is larger than said heater core in size, wherein said evaporator and said heater core are positioned in said casing in a generally parallel arrangement, and wherein said full-passage includes, at a downstream end thereof, an air guide by which air from said heater core is guided toward an upstream part of said air-mix chamber.

2. An air conditioner as claimed in claim 1, wherein each of the slide doors has an edge, wherein the edges of the slide doors mutually face each other, and wherein one of the mutually facing edges of said first and second slide doors is equipped with a sealing member, so that when the mutually facing edges contact, a seal is achieved therebetween.

3. An air conditioner as claimed in claim 2, wherein each of said first and second slide doors has a convex outer surface, so that the first and second doors are adapted to slide beneath a concavely curved inner surface of said downwardly curved upper wall of said housing when varying the open area of the first, second and third outlet openings.

4. An air conditioner as claimed in claim 3, in which each of said first and second slide doors is equipped on the convex outer surface with a sealing member which slidably contacts the concavely curved inner surface of said downwardly curved upper wall of the housing to achieve a sealing therebetween when the slide door is slid under said downwardly curved upper wall.

5. An air conditioner as claimed in claim 2, wherein said first slide door is arranged to slide to selectively close said first and second outlet openings, and wherein said second slide door is arranged to slide to selectively close said second and third outlet openings.

6. An air conditioner as claimed in claim 2, in which said first and second slide doors are arranged to slide on a same traveling path.

7. An air conditioner as claimed in claim 6, in which said air mix-door is of a slide type which vertically movably arranged between said evaporator and said heater core.

8. An air conditioner as claimed in claim 1, wherein said first outlet opening is adapted to lead to an air-blow opening which faces a windshield, wherein said second outlet opening is adapted to lead to an air-blow opening which faces a middle-high portion of the passenger room, and wherein said third outlet opening is adapted to lead to an air-blow opening which faces a floor of the passenger room.

9. An air conditioner of a motor vehicle, comprising:
a casing including an air intake opening, an evaporator chamber, a full-passage, a bypass-passage and an air-mix chamber, each of said full-passage and said bypass-passage extending from said evaporator chamber to said air-mix chamber independently;
a housing having a downwardly curved upper wall which is incorporated with said casing to cover said air-mix chamber, said downwardly curved upper wall having first, second and third outlet openings which are adapted to communicate with given portions of a passenger room of the vehicle respectively;
an air flow producing device which forces air into said evaporator chamber from said air intake opening;
an air-mix door movably installed in said casing to selectively open and close said full-passage and said bypass-passage;
an evaporator installed in said evaporator chamber;
a heater core installed in said full-passage; and
a slide door assembly mounted below said downwardly curved upper wall of said housing, said slide door assembly including first and second slide doors which are arranged to vary the open area of the first, second and third outlet openings in cooperation with each other;
wherein said casing includes, at an upstream part of said evaporator chamber, an air guide by which air from said air intake opening is guided toward said evaporator.

10. An air conditioner of a motor vehicle, comprising:
a casing including an air intake opening, an evaporator chamber, a full-passage, a bypass-passage and an air-mix chamber, each of said full-passage and said bypass-passage extending from said evaporator chamber to said air-mix chamber independently;
a housing having a downwardly curved upper wall which is incorporated with said casing to cover said air-mix chamber, said downwardly curved upper wall having first, second and third outlet openings which are adapted to communicate with given portions of a passenger room of the vehicle respectively;
an air flow producing device which forces air into said evaporator chamber from said air intake opening;
an air-mix door movably installed in said casing to selectively open and close said full-passage and said bypass-passage;
an evaporator installed in said evaporator chamber;
a heater core installed in said full-passage; and
a slide door assembly mounted below said downwardly curved upper wall of said housing, said slide door assembly including first and second slide doors which are arranged to vary the open area of the first, second and third outlet openings in cooperation with each other,
wherein said air intake opening comprises two air intake openings respectively formed in side walls of said casing, and wherein said air flow producing device comprises two air blowers which are respectively mounted on outer sides of said side walls of said casing, so that upon energizing the air blowers, air flows produced by said air blowers are forced to enter the evaporator chamber of said casing through said two air intake openings respectively.

11. An air conditioner as claimed in claim 10, in which a front wall of said casing is formed at its inner surface with an air guide by which the two air flows from the two air intake openings are evenly guided toward said evaporator.

12. An air conditioner as claimed in claim 11, in which each of said air blowers comprises a scroll chamber, a multiblade fan rotatably installed in said scroll chamber, and an electric motor for driving the fan, said scroll chamber having an outlet which is exposed to the corresponding air intake opening.

13. An air conditioner as claimed in claim 12, in which said scroll chamber has an inlet which is connected to both an outer air intake port into which an outside air is led and an inner air intake port into which air in the passenger room is led, and in which said outer air intake port and said inner air intake port are selectively closed by a port switching mechanism.

14. An air conditioner of a motor vehicle, comprising:
a casing including an air intake opening, an evaporator chamber, a full-passage, a bypass-passage and an air-mix chamber, each of said full-passage and said bypass-passage extending from said evaporator chamber to said air-mix chamber independently;
a housing having a downwardly curved upper wall which is incorporated with said casing to cover said air-mix chamber, said downwardly curved upper wall having first, second and third outlet openings which are adapted to communicate with given portions of a passenger room of the vehicle respectively;
an air flow producing device which forces air into said evaporator chamber from said air intake opening;
an air-mix door movably installed in said casing to selectively open and close said full-passage and said bypass-passage;
an evaporator installed in said evaporator chamber;
a heater core installed in said full-passage; and
a slide door assembly mounted below said downwardly curved upper wall of said housing, said slide door assembly comprising:
first and second slide doors which are arranged to vary the open area of the first, second and third outlet openings in cooperation with each other; side walls of said housing;

first and second drive shafts supported by said side walls in a maimer to rotate about respective axes;

first and second sector gears respectively secured to said first and second drive shafts to rotate therewith;

first aid second concave racks provided on said first and second slide doors respectively and respectively engaged with said first and second sector gears;

a guide structure for guiding movement of said first and second slide doors; and a link mechanism which is adapted to turn said first and second drive shafts in order to move said first and second drive doors relative to said downwardly curved upper wall of said housing.

15. An air conditioner as claimed in claim 14, in which said guide structure comprises:

two curved guide slots respectively formed in said side walls of said housing;

first two groups of guide pins provided on side ends of said first slide door respectively and slidably engaged with upper parts of said curved guide slots respectively; and second two groups of guide pins provided on side ends of said second slide door respectively and slidably engaged with lower parts of said curved guide slots respectively.

16. An air conditioner as claimed in claim 15, in which each of said curved guide slots is formed on its inside wall with a plurality of projected portions, so that when the guide pins of said first and second slide doors run onto the projected portions, the first and second slide doors are shifted toward said downwardly curved upper wall of said housing.

17. An air conditioner as claimed in claim 16, in which each of said first and second slide doors is equipped at its convex outer surface with a sealing member which slidably contacts a concavely curved inner surface of said downwardly curved upper wall of said housing to achieve a sealing therebetween.

18. An air conditioner as claimed in claim 17, in which one of mutually facing ends of said first and second slide doors is equipped with a sealing member, so that when the mutually facing edges contact, a sealing is achieved therebetween.

19. An air conditioner as claimed in claim 14, in which said link mechanism comprises:

a first link fixed to said first drive shaft, said first link having a slot;

a second link fixed to said second drive shaft, said second link having a first projection;

a drive lever pivotally connected to one of said side walls of said housing, said drive lever having a second projection and a bent slot, wherein said first projection is slidably engaged with said bent slot and said second projection is slidably engaged with the slot of said first link.

20. An air conditioner as claimed in claim 14, in which members of teeth provided by each of said first and second sector gears at opposed end portions have a height which gradually increases as the members near the ends.

21. An air conditioner as claimed in claim 14, in which each of said first and second sector gears is provided at opposed edges with recesses in order to suppress interference between the first and second sector gears.

* * * * *